(12) United States Patent
Springfield et al.

(10) Patent No.: US 8,341,393 B2
(45) Date of Patent: Dec. 25, 2012

(54) SECURITY TO EXTEND TRUST

(75) Inventors: Randall S. Springfield, Chapel Hill, NC (US); Howard J. Locker, Cary, NC (US); David Rivera, Durham, NC (US); Joseph M. Pennisi, Apex, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 446 days.

(21) Appl. No.: 12/641,029

(22) Filed: Dec. 17, 2009

(65) Prior Publication Data

US 2011/0154010 A1    Jun. 23, 2011

(51) Int. Cl.
  *H04L 29/06* (2006.01)
(52) U.S. Cl. ............ 713/100; 713/2; 713/175; 713/187
(58) Field of Classification Search .................. 713/1–2, 713/100, 172–176, 187; 707/687, 698
See application file for complete search history.

(56) References Cited

U.S. PATENT DOCUMENTS

| | | | |
|---|---|---|---|
| 6,263,431 B1* | 7/2001 | Lovelace et al. | 713/2 |
| 2002/0156737 A1* | 10/2002 | Kahn et al. | 705/51 |
| 2005/0262571 A1* | 11/2005 | Zimmer et al. | 726/27 |
| 2006/0212939 A1* | 9/2006 | England et al. | 726/22 |
| 2009/0300348 A1* | 12/2009 | Aciicmez et al. | 713/156 |
| 2010/0082991 A1* | 4/2010 | Baldwin et al. | 713/176 |
| 2010/0115256 A1* | 5/2010 | Challener et al. | 713/2 |

\* cited by examiner

*Primary Examiner* — Hadi Armouche
(74) *Attorney, Agent, or Firm* — Brian J. Pangrle (57) ABSTRACT

An exemplary apparatus includes one or more processors; memory; circuitry configured to hash a value associated with core root of trust measurement code and system management code; store the hash in a secure register; load an operating system; validate a certificate associated with the core root of trust measurement code and validate a certificate associated with the system management code; based on the validated certificates, provide an expected hash associated with the core root of trust measurement code and the system management code; decide if the expected hash matches the hash stored in the register; and, if the expected hash matches the hash stored in the register, commence a dynamic root of trust measurement session. Various other apparatuses, systems, methods, etc., are also disclosed.

18 Claims, 9 Drawing Sheets

SECURITY TO EXTEND TRUST

TECHNICAL FIELD

Subject matter disclosed herein generally relates to techniques for securely loading and using software.

BACKGROUND

A typical computing platform often relies on an operating system provided by a party other than the platform vendor. Such an operating system may be referred to as third-party software. A platform vendor typically supplies so-called boot software that establishes a root of trust and that provides for loading an operating system. During a conventional boot process, a gap exists between an initial, vendor controlled environment and a subsequent, third-party operating system environment. Where a vendor aims to invoke software features such as a hypervisor after loading a third-party operating system, issues may exist as to the credibility of the root of trust. Various exemplary methods, apparatuses, systems, etc., described herein aim to reduce certain types of risks that may arise from such a gap (e.g., a gap between vendor software and a third-party operating system).

SUMMARY

An exemplary apparatus includes one or more processors; memory; circuitry configured to hash a value associated with core root of trust measurement code and system management code; store the hash in a secure register; load an operating system; validate a certificate associated with the core root of trust measurement code and validate a certificate associated with the system management code; based on the validated certificates, provide an expected hash associated with the core root of trust measurement code and the system management code; decide if the expected hash matches the hash stored in the register; and, if the expected hash matches the hash stored in the register, commence a dynamic root of trust measurement session. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
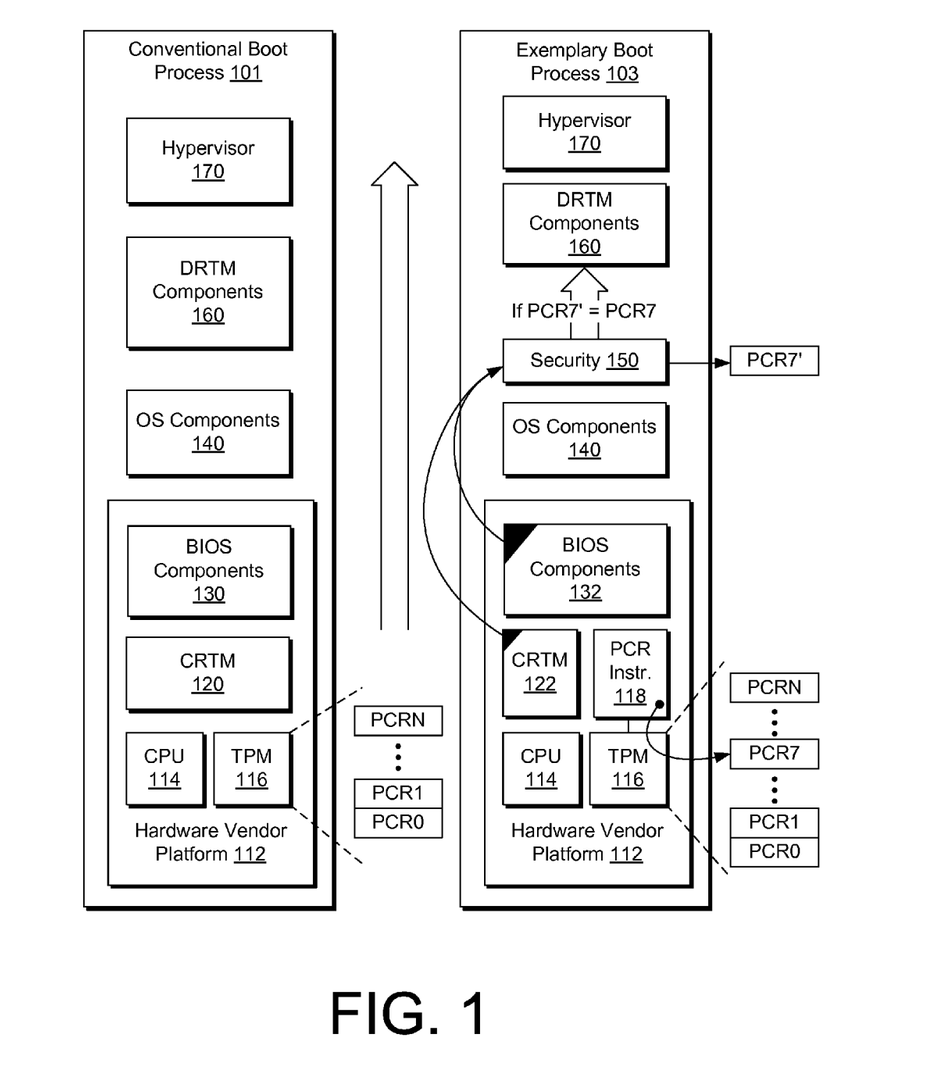
FIG. 1 is a diagram of a conventional boot process and an exemplary boot process where the exemplary boot process includes added security.

FIG. 1 shows a conventional boot process 101 and an exemplary boot process 103. As described herein, the exemplary boot process 103 allows for secure commencement of a dynamic root of trust measurement session. An exemplary configuration may also allow for secure computing, for example, upon resuming from one or more low power states (e.g., a sleep state). Below, a description of the conventional boot process 101 is followed by a description of the exemplary boot process 103.

In the conventional boot process 101, a hardware vendor platform 112 includes a CPU 114 and a Trusted Platform Module (TPM) 116. The TPM 116 includes various secure registers, often referred to as platform configuration registers (PCRs). During the conventional boot process 101, core root of trust measurement (CRTM) code 120 and BIOS code components 130 are executed with assurances from the TPM 116. Specifically, the TPM 116 "measures" the code 120 and 130 by storing values in the PCRs. A conventional approach relies on a so-called "extend" function that hashes a stored value and a code value and stores the result in a PCR. For example, a PCR may store SHA-1(value1∥value2) where value1 is a SHA-1 hash of a code value and value2 is a code value concatenated to value1. The concatenated value is SHA-1 hashed and stored to the PCR. A log may also be generated that corresponds to operations performed by the TPM, for example, as CRTM code 120 calls for measurement of a BIOS code component (e.g., system management mode handler code, referred to herein as SMM code or SMM handler code), as the BIOS code component calls for measurement of another code component, etc.

As common in computing, the hardware platform 112 is provided with a third-party operating system, represented by OS components 140. In the example of FIG. 1, after the hardware is up and running, BIOS usually provides instructions for loading the OS components 140. After loading the OS components 140, a dynamic root of trust measurement session may commence based on DRTM code 160. The DRTM 160 aims to extend assurances of secure computing beyond the CRTM. In essence, the DRTM aims to maintain a chain of trust as applications or other modules are executed. As shown in FIG. 1, a hypervisor 170 may be loaded once a DRTM session has been established where the DRTM acts to guarantee secure computing.

In most situations, the conventional boot process 101 works suitably to provide secure computing. However, a so-called gap exists between the CRTM and DRTM is where trust may be breached. The gap may be defined as a hand-off of resource control (or priorities) between the established CRTM environment and a subsequent environment associated with loading of the OS components 140. As described herein, the subsequent environment may be a static core root of measurement (SRTM) environment. From the perspective of the hardware vendor, the third-party OS may be considered non-secure and include openings for attack. Such openings may allow an attacker to alter the CRTM code 120 or one or more BIOS code components 130, which, in turn, breach the core root of trust and render the platform unusable or even destructive.

In instances where a hardware vendor (or user) desires to provide a high priority (i.e., high privilege) hypervisor 170 (e.g., which may allow for various beneficial CPU states), a breach of trust associated with the OS components 140 can confound the DRTM environment's ability to provide secure computing. To minimize risks associated with the so-called gap, the exemplary boot process 103 introduces additional instructions for execution during the boot process.

In the example of FIG. 1, the exemplary boot process 103 includes several security features. As shown, the hardware vendor platform 112 now includes PCR instructions 118 and signed CRTM code 122 and one or more signed BIOS code components 132. The signatures may be digital signatures, for example, as associated with a digital certificate. The PCR instructions 118 can operate in conjunction with the signed code 122, 132 according to various schemes.

An exemplary secure scheme includes hashing CRTM code to PCR7, which according to various standards is not specifically assigned. Next, PCR7 is extended (via an extend operation) with a BIOS code component (e.g., a component of 132). For example, after the extend operation, PCR7 stores a hash of a hash of the CRTM code concatenated with the BIOS code component. After the value of PCR7 has been determined, the process 103 continues to load the OS components 140, which may be loaded in conjunction with a SRTM environment. However, prior to the establishing the DRTM environment per the DRTM components 160, a security code 150 executes.

As described herein, the security code 150 may be part of a so-called dynamic computing environment (DCE) preamble that executes prior to full loading of the DRTM components 160 to establish the DRTM environment. The security code 150 may access the digitally signatures of the CRTM code 122 and the BIOS code 132, verify these signatures (e.g., compare to a hash of the respective codes 122, 132) and then generate an expected value for PCR7. Once an expected value for PCR7 has been generated (e.g., using a SHA-1 function or other TPM function used for PCR7), the security code 150 compares the expected value for PCR7 to the actual value stored in PCR7. Such a security check aims to extend the root of trust from the hardware vendor's platform 112 forward to the DRTM environment. In other words, the security code 150 aims to bridge the so-called gap as associated with the loading of the third-party OS components 140. In such a manner, a hardware vendor can provide the platform 112 and the hypervisor 170 and provide some assurances that, after loading the OS 140, the root of trust between the platform 112 and the hypervisor 170 is valid. Further, as described in more detail below, the security code 150 may provide assurances upon code updates or resuming from one or more low power states (e.g., sleep states).

Figure 2:
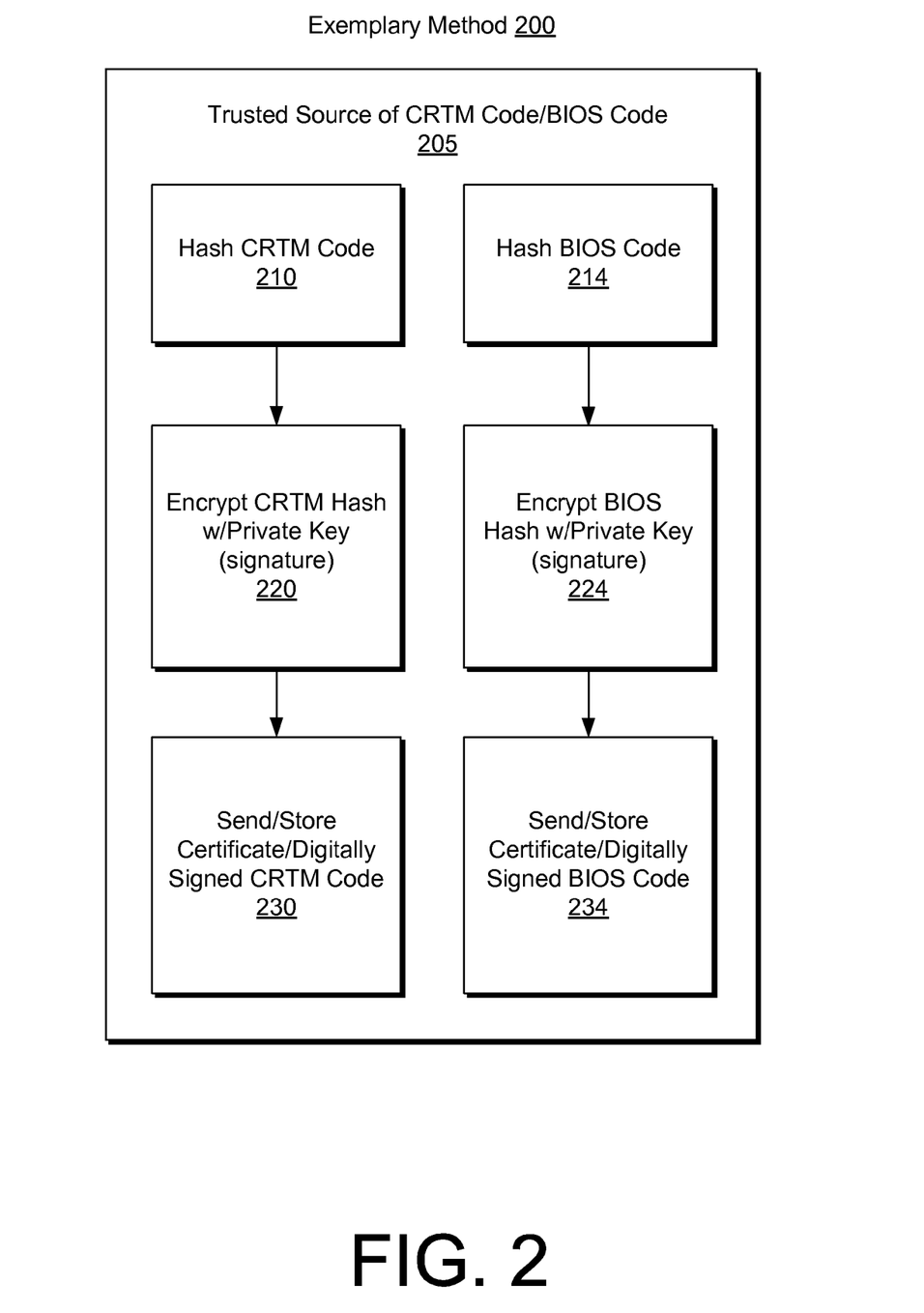
FIG. 2 is a diagram of an exemplary method for signing code for use in an exemplary boot process and for use in an exemplary security process.

FIG. 2 shows an exemplary method 200 for providing digitally signed code. In the example of FIG. 2, a trusted source 205 provides digitally signed CRTM code and BIOS code, which may be a component of BIOS (e.g., a BIOS code component). In respective hash blocks 210, 214, the CRTM code and the BIOS code are hashed using a hash operation to generate a CRTM code hash and a BIOS code hash. Next in respective encryption blocks 220, 224, the CRTM code hash and the BIOS code hash are encrypted using a private key to generate a signature for the CRTM code and a signature for the BIOS code. These signatures can be combined with the CRTM code and the BIOS code and stored to a memory or sent to a computing device, as indicated in blocks 230 and 234, respectively. For example, in a factory, the trusted source may be the manufacturer of the computing device and computing devices may be manufactured with stored, signed code. In another example, where a manufacturer seeks to update code, the code may be sent to various end-user computing devices (e.g., as part of a BIOS upgrade, etc.). Upon receipt of such code, a computing device may automatically upgrade the code (e.g., CRTM code, BIOS code or CRTM code and BIOS code). According to the exemplary boot process 103 of FIG. 1, the code and the signature would be accessible by the security code 150. One or more other techniques may be used alternatively or in addition to those shown in FIG. 2.

Figure 3:
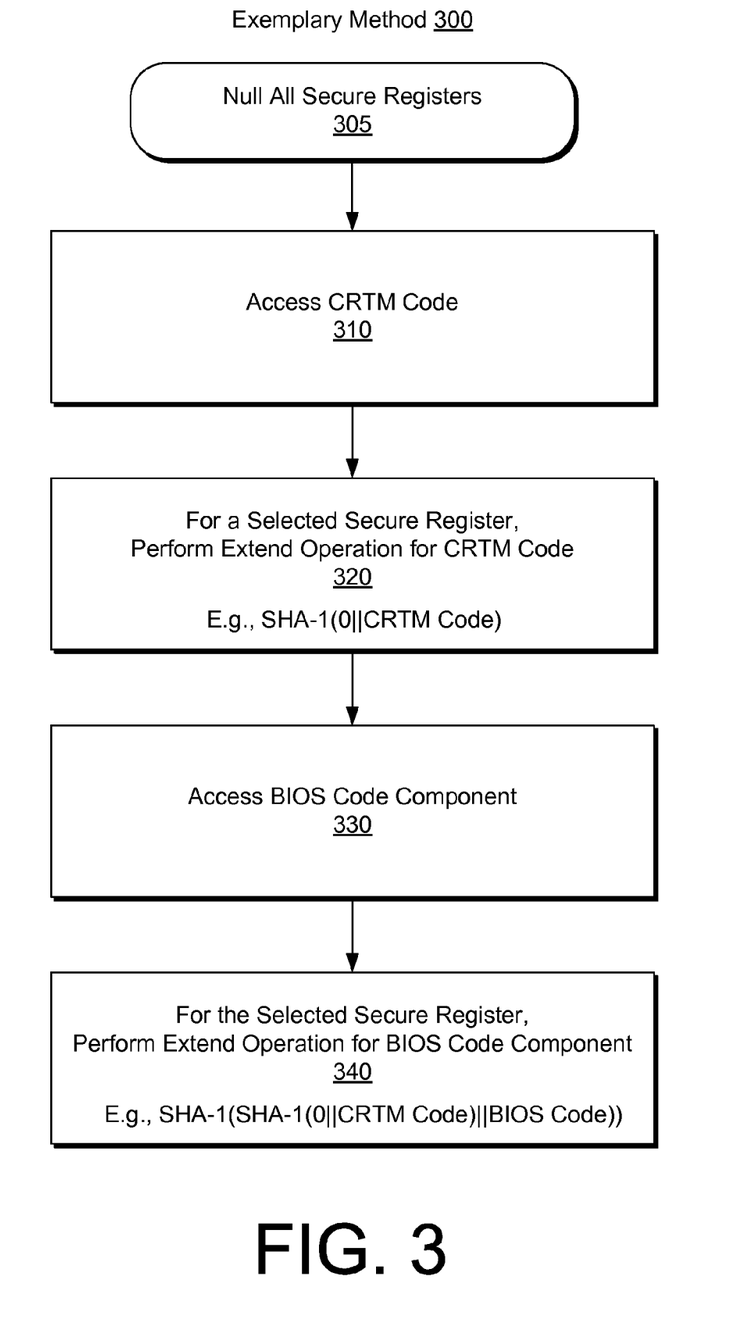
FIG. 3 is a diagram of an exemplary method for generating and storing a value in a secure register.

FIG. 3 shows an exemplary method 300 that focuses on storing a value in a secure register. In a null block 305, all secure registers are nulled. Such a nulling process typically occurs responsive to a shut-down or a cold start (e.g., no or lowest power state).

According to the method 300, in an access block 310, boot instructions cause a computing device to access CRTM code. Next, in an extend block 320, for a selected secure register, an extend operation is performed for the accessed CRTM code. As explained, this operation causes a hash of the accessed CRTM to be stored in the secure register. In the example of FIG. 3, the CRTM code may include instructions to, in an access block 330, access a BIOS code component. The instructions may call for a measurement process, for example, as performed in part by a TPM during a boot. As described herein, these instructions or other instructions call for an extend operation per the extend block 340. Accordingly, the extend block 340 executes an extend operation to hash a concatenation of the hash of the CRTM code and the BIOS code component and to store the hash in the secure register. After completion of block 340, the secure register stores a value representative of the accessed CRTM code and the accessed BIOS code component. As described herein, the CRTM code may be executed after being accessed and the BIOS code component may be executed after being accessed. Further, the hash of the concatenation may optionally occur prior to the execution of the BIOS code component.

In a conventional TPM, PCRs can be changed by only two functions: (1) Reboot, which clears all PCRs; and (2) Extend, which concatenates a 160 bit number and a hash stored in a PCR, hashes the concatenation and stores the resulting hash in the PCR. In general, there is no other way for a system to change the value of any PCR, especially where TPM hardware behaves according to the TCG specification without any direct physical attacks.

Figure 4:
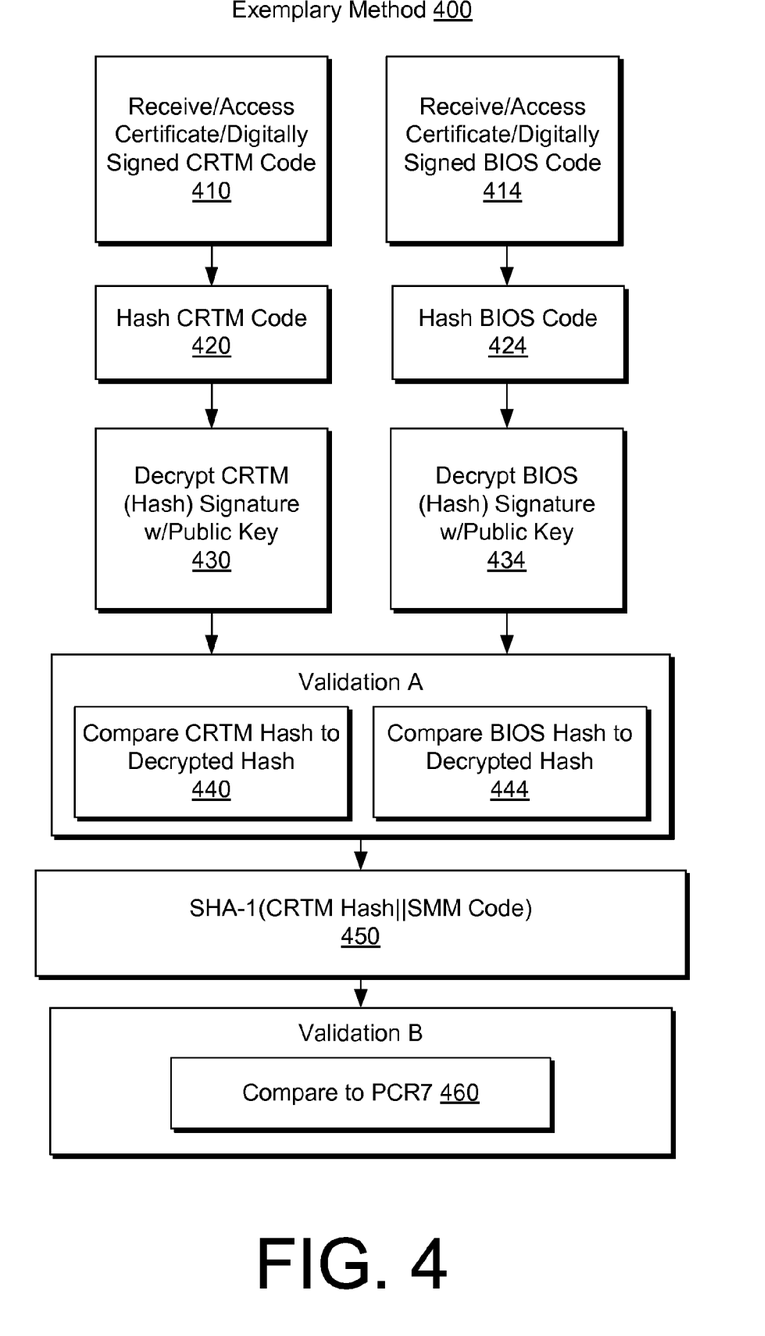
FIG. 4 is a diagram of an exemplary method that performs security checks.

FIG. 4 shows an exemplary method 400 that includes two validations (A and B) to help ensure secure computing. In respective reception or access blocks 410, 414, a computing device access signed CRTM code and signed BIOS code, which may be a component of a multi-component BIOS framework. In respective hash blocks 420, 424, the computing device hashes the CRTM code and the BIOS code. Next, in respective decryption blocks 430, 434, the computing device decrypts the CRTM code signature and the BIOS code signature using a public key. As explained with respect to the method 200 of FIG. 2, a signature may be an encrypted hash.

In one validation process, Validation A, in respective comparison blocks 440, 444, the computing device compares the CRTM code hash to the decrypted CRTM code hash and compares the BIOS code hash to the decrypted BIOS code hash. In a hash block 450, the computing device generates an expected value based at least in part on the signed CRTM code and at least in part on the signed BIOS code. As shown in the example of FIG. 4, the SHA-1 hash function is used according to a conventional extend operation associated with a TPM. Next, another validation occurs, Validation B, where, in a comparison block 460, the expected value is compared to the value stored in the secure register (e.g., PCR7).

Accordingly, a computing device can halt operation or take other action if the Validation A fails or if the Validation B fails. In the example of FIG. 4, failure at Validation A may indicate a problem with code, a key, a signature, etc.; whereas, failure at Validation B may indicate a problem with the CRTM code, the BIOS code, the TPM, the PCR, etc. In either instance, the computing device may halt computing or take one or more actions that aim to rectify the situation.

Figure 5:
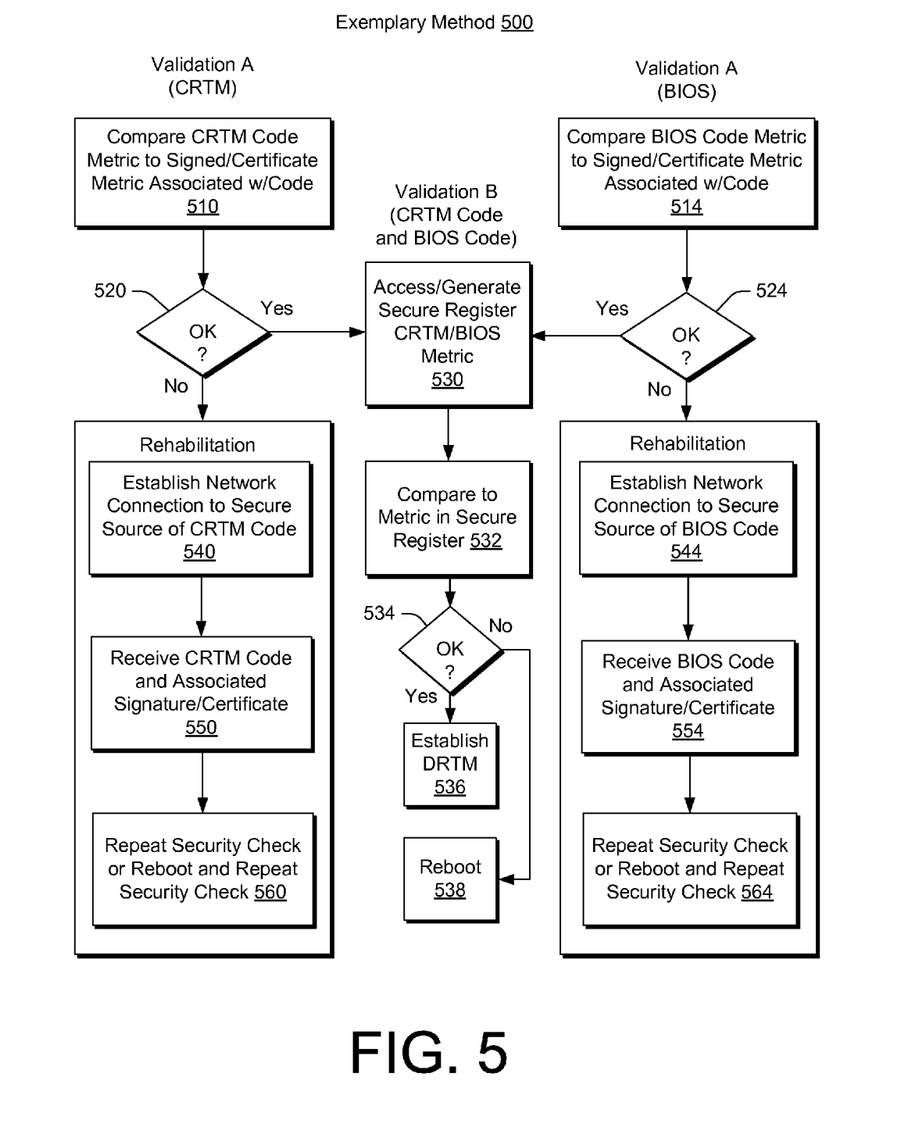
FIG. 5 is a diagram of an exemplary method that can take action responsive to one or more security checks.

FIG. 5 shows an exemplary method 500 that includes validations or verifications for code, associated security metrics or code and associated security metrics. In the example of FIG. 5, the method 500 includes a CRTM validation, a BIOS validation and a CRTM and BIOS validation. The CRTM validation and the BIOS validation may occur substantially in parallel or sequentially.

In respective comparison blocks 510, 514, a code metric is compared to a security metric (e.g. signature, certificate, etc.) for the code. Respective decision blocks 520, 524 decide whether the metrics compare favorably (e.g., are identical).

If both of the decision block 520, 524 decide that the metrics compare favorably, then the method 500 proceeds to an access or generation block 530 that accesses or generates a CRTM/BIOS metric as an expected value to be found in a secure register (see, e.g., the method 300 of FIG. 3). Thereafter, a comparison block 532 compares the expected metric value to the value in the secure register 532. A decision block 534 follows that decides whether the comparison is favorable. If the decision block 534 decides that the comparison is favorable, the method 500 continues, for example, at an establishment block 536 that establishes a DRTM environment (e.g., by loading and executing appropriate DRTM code). However, if the decision block 534 decides that they two metrics do not compare favorable (e.g., they differ), then the method 500 continues at a reboot block 538, which calls for a reboot and reloading of the CRTM code and BIOS code, re-establishing a metric for storage in the secure register, etc. Alternatively, or in addition to, an alarm may be issued via a user interface of a computing device, to a hardware vendor, other party, etc. Where an alarm is issued to a hardware vendor (e.g., a secure server of a hardware vendor), corrective action may be taken. Various types of corrective action or rehabilitation are explained below with respect to instances where the CRTM code or the BIOS code. Such action may be taken responsive to a "no" decision by the decision block 534.

Referring again to the decision blocks 520, 524, where either or both of these blocks decide that a comparison is unfavorable (e.g., the compared values differ), rehabilitation may occur to rehabilitate the CRTM code, the BIOS code and the respective associated security metrics (e.g., signatures, certificates, etc.).

In respective establishment blocks 540, 544, a computing device (see, e.g., the security code 150) establishes a network connection to a secure source of the CRTM code or the BIOS code. While not shown in the method 500, if a secure connection cannot be established, the method 500 may issue an alarm (e.g., a warning to a user). Such an alarm may indicate conditions that may warrant further corrective action (e.g., to recover from an attack on the computing device).

Where the method 500 can establish an appropriate connection or connection per blocks 540, 544, a computing device may then receive code and an associated security metric (e.g., signature, certificate, etc.) from the secure source, as indicated by respective reception blocks 550, 554. As indicated in blocks 560 and 564, upon successful receipt, the rehabilitation processes can continue by repeating one or more of the "Validation A" processes (e.g., return to blocks 510 or 514 or 510 and 514) or the method 500 may call for a reboot, which, upon reboot, will repeat the validation processes. Accordingly, as described herein, corrective action may be taken when one or more validations (or verifications) fail.

Figure 6:
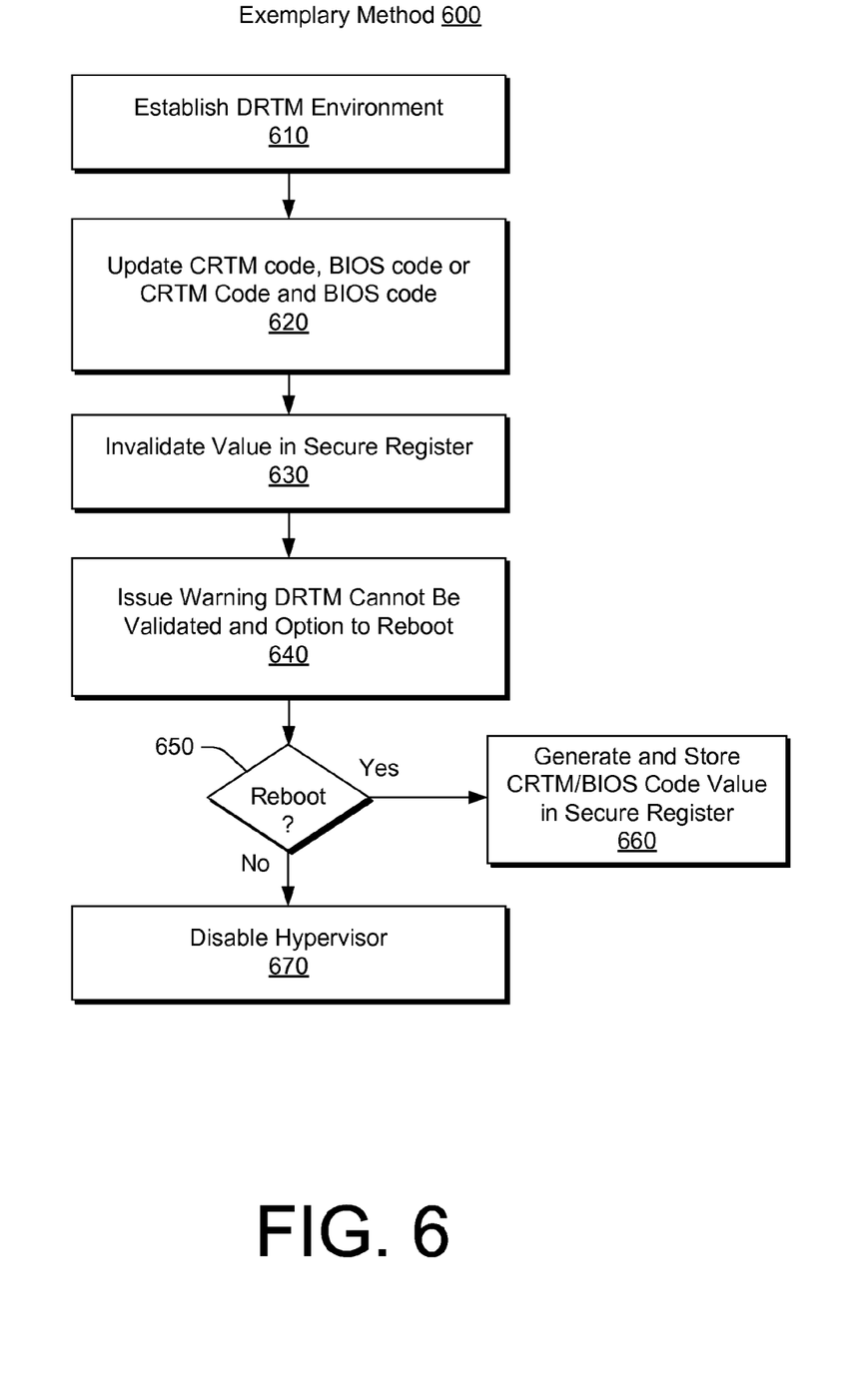
FIG. 6 is a diagram of an exemplary method that includes updating code and taking one or more actions related to security.

FIG. 6 shows an exemplary method 600 that includes updating CRTM code, one or more BIOS code components associated with security (e.g., Validations A and B), or both CRTM code and one or more BIOS code components associated with security.

In the example of FIG. 6, an establishment block 610 establishes a DRTM environment (e.g., after passing various security tests such as Validations A and B). An update block 620 includes updating code associated with a security test or tests. Responsive to the update, an invalidation block 630 invalidates a value stored in a secure register (see, e.g., the PCR value of the method 300 of FIG. 3). Responsive to the invalidation, an issuance block 640 issues a warning that the DRTM environment cannot be validated (e.g., per Validations A or B). As indicated in the example of FIG. 6, the issuance block 640 may present an option (e.g., via a user interface) to allow a user to reboot. Alternatively, security code (e.g., the code 150) may automatically cause a reboot.

Where an option to reboot is provided (e.g., via a user interface), a decision block 650 responds to the option by either deciding to reboot or deciding not to reboot. Upon a reboot, the method 600 continues at a generation block 660 that generates and stores a value to the secure register, which had previous been invalidated per the invalidation block 630. Where a reboot does not occur, the method 600 may take one or more actions. For example, the method 600 may continue to a disablement block 670 that disables a high priority (i.e., high privilege) hypervisor as execution of such a hypervisor in an unsecured environment (e.g., an environment where it is not possible to validate security) may be detrimental (e.g., to stored information, actions taken by the computing device, etc.).

Figure 7:
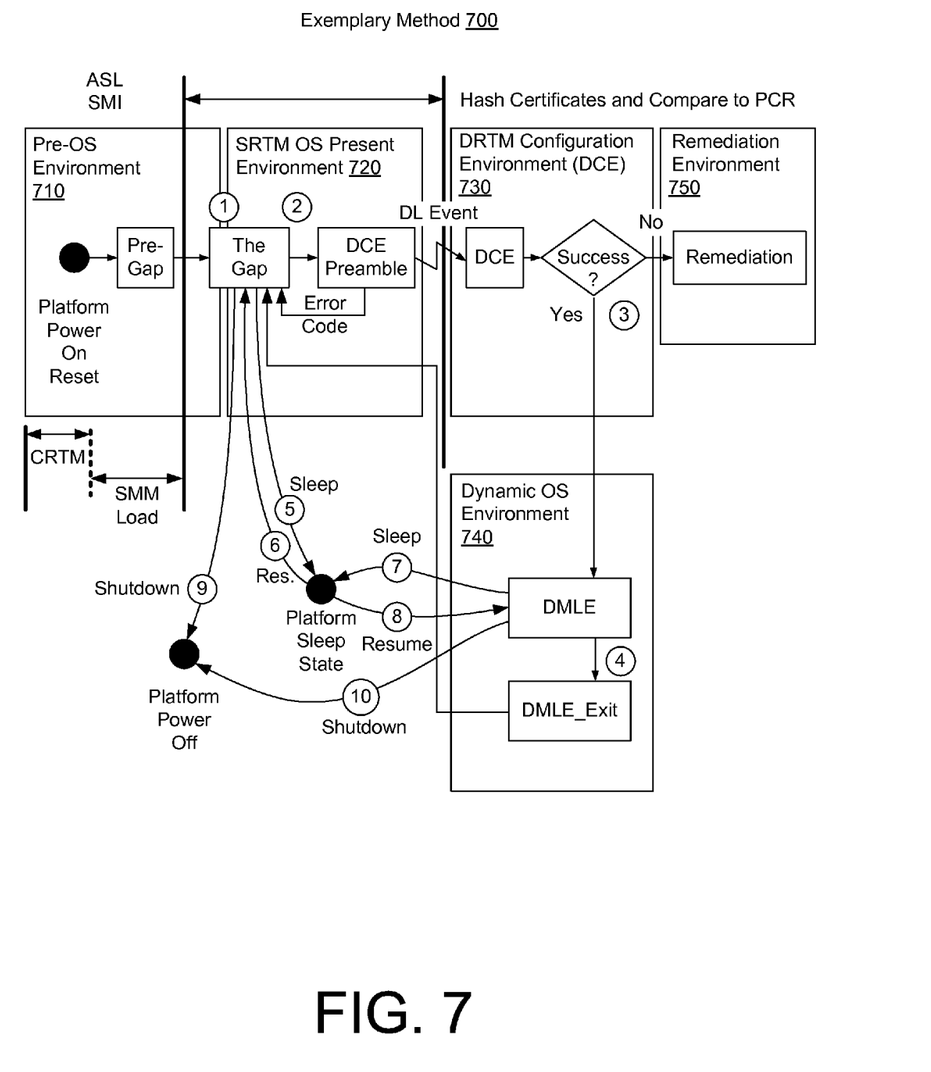
FIG. 7 is a diagram of exemplary method that includes security techniques to assist with secure execution of a hypervisor.

FIG. 7 shows an exemplary method 700 that refers to various times (time 1 to time 10) and various power states. The method 700 indicates various environments, including a pre-OS environment 710, a SRTM environment 720, a DRTM environment 730, a dynamic OS environment 740 and a remediation environment 750. In the example of FIG. 7, CRTM code execution is shown as occurring in the pre-OS environment 710 as well as execution of SMM code (e.g., SMM helper or other code component that may be associated with BIOS code or part of BIOS code). As described herein, the SMM code is a management code component, which is typically provided by a hardware vendor.

At time 1, the so-called gap exists, which is part of the SRTM OS present environment 720. At time 2, a so-called DRTM computing environment (DCE) preamble executes that may be a check point that decides whether a secure environment can be maintained or extended for commencing the DRTM environment 730. For example, the DCE preamble code may include the security code 150 of FIG. 1. Where the DCE preamble code executes and successfully verifies security, a decision is made to enter the DRTM environment 730.

At time 3, a decision is made whether the DRTM environment 730 was successfully established. If it is not established successfully, control may be passed to a remediation environment 750. During a successful boot process where the DRTM environment 730 has been established, control may be extended to the dynamic OS environment, which is shown as including a DMLE component, which may be a hypervisor.

As shown in the example of FIG. 7, the DMLE can transition to or from various states (e.g., platform power off and platform sleep). The DMLE may also exit, which is shown at time 4. Upon exit, control passes back to the so-called gap. Accordingly, if a user or a computing device desire re-entry of the DMLE, security may be established by checking a value in a secure register (e.g., PCR7, as explained with respect to the method 300 of FIG. 3). Further, as indicated by times 5 and 6, the SRTM environment 720 may enter and resume from a sleep state and as indicated by times 7 and 8, the DMLE of the dynamic OS environment may enter and resume from a sleep state. As described herein, an exemplary method may direct a handle from a sleep state to the SRTM environment 720 to recheck security prior to allowing the DMLE (e.g., hypervisor) to resume from the sleep state. Accordingly, as the DMLE enters the sleep state, a handle may shift to a component in the SRTM environment (e.g., optionally the DCE preamble) such that a direct resume of the DMLE is not possible without first performing a security check.

As described herein, various exemplary techniques can allow for securely loading a hypervisor after a non-secure OS is loaded. As explained, a boot process can be broken up into several stages. For example, in a first stage (e.g., from power on until a SMM handler is loaded) may be referred to as a pre-gap stage. This stage can act to establish a basic security level for a computing platform. After the pre-gap stage, as explained with respect to FIG. 7, unsecure code (e.g., third-party code such as OS components) can run up and until a hypervisor loading process is started (DCE preamble). In such an example, the DCE preamble acts to load a DRTM configuration environment (e.g., vendor/OEM provided code), which is typically responsible for detecting security of a computing platform prior to loading a hypervisor (e.g., the DMLE).

As explained, various problems may occur with respect to the DCE being able to determine the security level. For example, if the SMM is corrupt (e.g., as the SMM handler is typically either peer or a ring above the hypervisor), the hypervisor can be corrupted. In addition, if the BIOS code has been updated, there is a possibility that on sleep state transitions that a return path can be corrupted. As described herein, various exemplary techniques provide security that can assist a DCE to secure a platform.

As explained, pre-gap code can be broken down into segments, for example, Core Root of Trust (CRTM) code, which may be referred to as "boot block" code, and code that loads and executes up to and including a SMM load process (e.g., SMM helper code). As described herein, code associated with each of these two segments can have its own certificate (or signature, etc.). As described herein, instruction code (e.g., modified BIOS code) can call for hashing these two pieces of code into a platform vendor (e.g., OEM) defined PCR (e.g., PCR7). Accordingly, the DCE can read the value in the PCR and determine if the value in PCR equals a value that depends on the two certificates (e.g., in the two certificates, determined by the two certificates, etc., see, e.g., the method 400 of FIG. 4). Further, a conventional TCG log may not be available to a DCE, hence, access to a secure register (e.g., a PCR) allows for implementation of such security, for example, with minimal information and storage.

As mentioned, in instances where BIOS is updated, for example, after execution of pre-gap code, code executing coming out of sleep states can potentially be corrupt. Accordingly, responsive to a request to flash the computing platform, a SMM handler is usually responsible for determining the sanity of the code that is being flashed. As described herein, SMM handler code may include instruction that call for invalidating a value in a secure register, for example, by hashing an additional value into the secure register (e.g., "extend" PCR7) to invalidate the value in the secure register. By implementing this process, the DCE would securely reject requests to enter the hypervisor if the pre-gap code has been possibly corrupted.

As described herein, SMM handler code (e.g., to allow for SMM) may be considered a BIOS code component. Often, SMM code (SMI handler) is loaded and executed responsive to BIOS code instructions. In various conventional computing platforms, SMM is entered via a system management interrupt (SMI). A SMI may be caused by various events, such as, motherboard hardware or a chipset signaling via a designated pin of a processor chip, a SMI trigger by software via an I/O access to a location considered special by motherboard logic, an I/O write to a location which firmware has requested that the processor chip act on.

As described herein, an exemplary method can include hashing a value associated with core root of trust measurement code and system management code and storing the hash in a secure register; loading an operating system; validating a certificate associated with the core root of trust measurement code and validating a certificate associated with the system management code; based on the validated certificates, providing an expected hash associated with the core root of trust measurement code and the system management code; and, if the expected hash matches the hash stored in the register, commencing a dynamic root of trust measurement session and optionally loading a hypervisor secured by the dynamic root of trust session. Such a method may include, after commencing the dynamic root of trust measurement session, updating the system management code and altering the hash stored in the register. Accordingly, rebooting may occur that includes executing the core root trust measurement code and the system management code.

An exemplary method may, more generally, include creating one or more hashes, each hash associated with core root of trust measurement code, system management code, or core root of trust measurement code and system management code; storing the one or more hashes in one or more secure registers; loading an operating system; validating one or more certificates, each certificate associated with the core root of trust measurement code, the system management code or the core root of trust measurement code and the system management code; responsive to the validation of the one or more certificates, providing one or more expected hashes, each expected hash associated with the core root of trust measurement code, the system management code, or the core root of trust measurement code and the system management code; and, based on successfully matching each of the one or more expected hashes to a corresponding one of the one or more stored hashes, commencing a dynamic root of trust measurement session.

As described herein, where code is updated, an exemplary method may include providing a certificate for the updated code. For example, a method may include updating core root of trust measurement code and altering the hash stored in the register followed by rebooting to execute the core root trust measurement code and the system management code.

In instances where one or more hashes do not match, an exemplary method may include transmitting a message via a network. Further, responsive to the transmitted message, the method may include receiving one or more certificates. Thereafter, the method may repeat a validating procedure for code. For example, a method may include, after commencing a dynamic root of trust measurement session, updating core root of trust measurement code, system management code or core root of trust measurement code and system management code; altering a hash stored in a secure register; entering a sleep state; resuming from the sleep state; and preventing execution of a loaded hypervisor based on the alteration of the hash.

As described herein, an exemplary apparatus includes one or more processors; memory; circuitry configured to hash a value associated with core root of trust measurement code and system management code; store the hash in a secure register; load an operating system; validate a certificate associated with the core root of trust measurement code and validate a certificate associated with the system management code; based on the validated certificates, provide an expected hash associated with the core root of trust measurement code and the system management code; decide if the expected hash matches the hash stored in the register; and, if the expected hash matches the hash stored in the register, commence a dynamic root of trust measurement session. Such an apparatus may further include trusted platform module circuitry, circuitry configured to load a hypervisor secured by the dynamic root of trust measurement session, etc.

An exemplary apparatus may, more generally, include one or more processors; memory; circuitry configured to create one or more hashes, each hash associated with core root of trust measurement code, system management code or core root of trust measurement code and system management code; store the one or more hashes in one or more secure registers; load an operating system; validate one or more certificates, each certificate associated with the core root of trust measurement code, the system management code, or the core root of trust measurement code and the system management code; based on the one or more validated certificates, provide one or more expected hashes, each expected hash associated with the core root of trust measurement code, the management code, or the core root of trust measurement code and the system management code; decide if each of the one or more expected hashes matches a corresponding one of the one or more stored hashes; and, if each of the one or more expected hashes matches a corresponding one of the one or more stored hashes, commence a dynamic root of trust measurement session.

As described herein, one or more exemplary computer-readable media can include computer-executable instructions to instruct a computer to: access a stored hash of a value associated with core root of trust measurement code and system management code; validate a certificate associated with the core root of trust measurement code and validate a certificate associated with the system management code; based on the validated certificates, provide an expected hash associated with the core root of trust measurement code and the system management code; decide if the expected hash matches the hash stored in the register; and, if the expected hash matches the hash stored in the register, permit commencement of a dynamic root of trust measurement session. Such media may include instructions to alter the stored hash responsive to update of the core root of trust measurement code, the system management code or the core root of trust code and the system management code. Such media may include instructions to reboot the computer if the hashes do not match, instructions to transmit a message via a network if the hashes do not match, etc.

One or more exemplary computer-readable media may, more generally, include computer-executable instructions to instruct a computer to: access one or more stored hashes, each hash associated with core root of trust measurement code, system management code, or core root of trust measurement code and system management code; validate one or more certificates, each certificate associated with the core root of trust measurement code, the system management code, or the core root of trust measurement code and the system management code; based on the one or more validated certificates, provide one or more expected hashes, each expected hash associated with the core root of trust measurement code, the system management code, or the core root of trust measurement code and the system management code; decide if each of the one or more expected hashes matches a corresponding one of the one or more stored hashes; and, if each of the one or more expected hashes matches, permit commencement of a dynamic root of trust measurement session.

With respect to a hypervisor, a hypervisor may be or include features of the XEN® hypervisor (XENSOURCE, LLC, LTD, Palo Alto, Calif.). In a XEN® system, the XEN® hypervisor is typically the lowest and most privileged layer. Above this layer one or more guest operating systems can be supported, which the hypervisor schedules across the one or more physical CPUs. In XEN® terminology, the first "guest" operating system is referred to as "domain 0" (dom0). In a conventional XEN® system, the dom0 OS is booted automatically when the hypervisor boots and given special management privileges and direct access to all physical hardware by default. With respect to operating systems, a WINDOWS® OS, a LINUX® OS, an APPLE® OS, or other OS may be used by a computing platform.

As described herein, various acts, steps, etc., can be implemented as instructions stored in one or more computer-readable media. For example, one or more exemplary computer-readable media can include computer-executable instructions to instruct a computer to implement security.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 8:
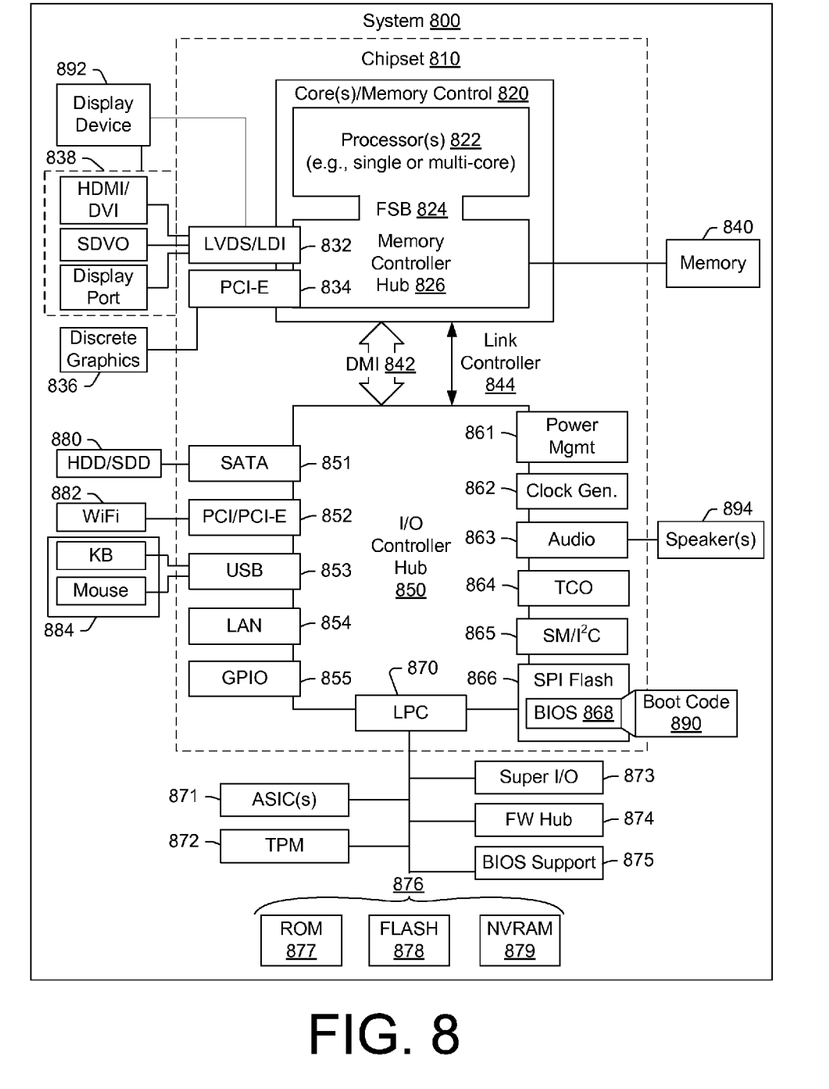
FIG. 8 is a diagram of an exemplary machine, which may be a client device, a server or other apparatus.

While various exemplary circuits or circuitry have been discussed, FIG. 8 depicts a block diagram of an illustrative exemplary computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 800.

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (×16) PCI-E port for an external PCI-E-based graphics card. An exemplary system may include AGP or PCI-E for support of graphics.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), mice and various other devices (e.g., cameras, phones, storage, media players, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, an exemplary client device or other machine may include fewer or more features than shown in the system 800 of FIG. 8.

Figure 9:
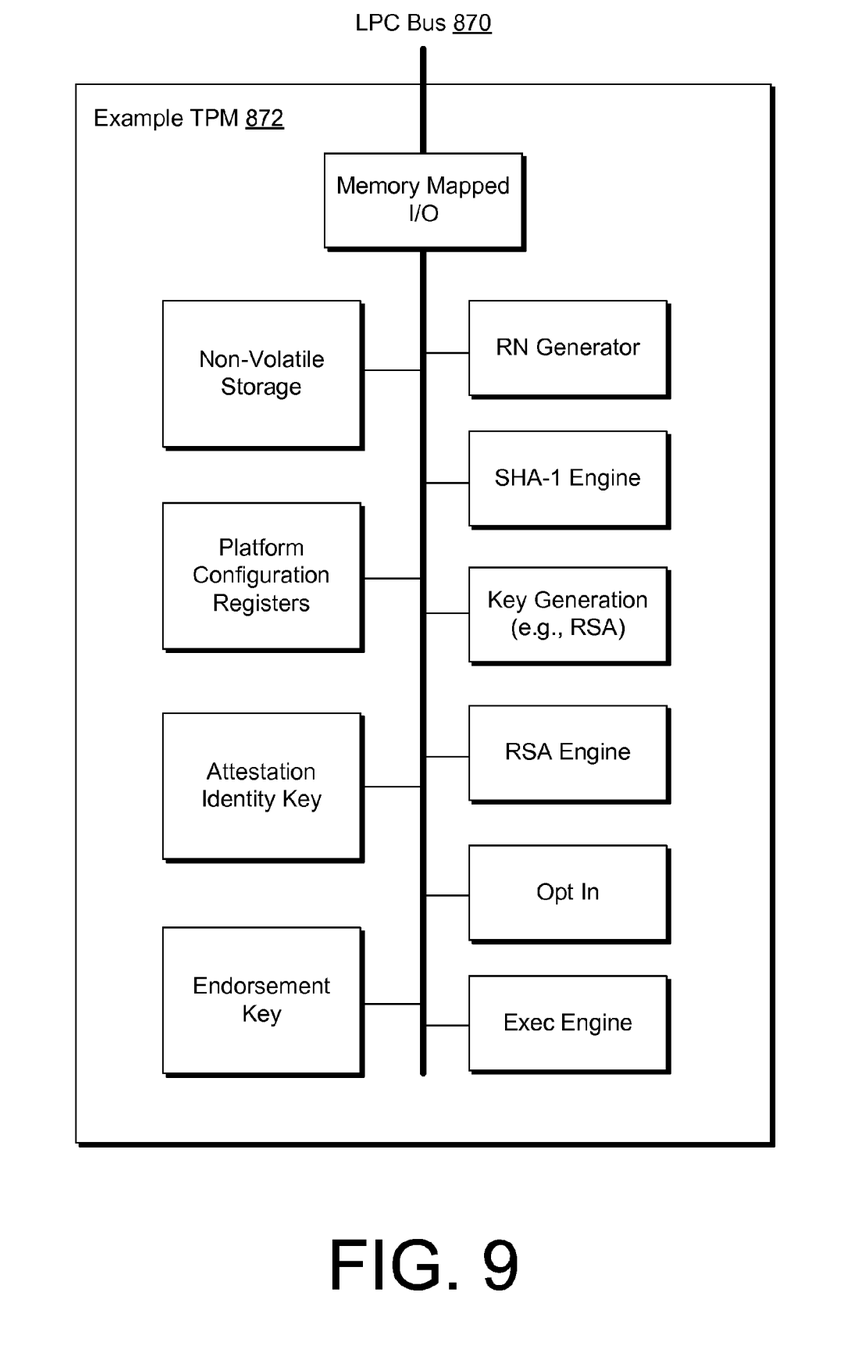
FIG. 9 is a diagram of a trusted platform module (TPM) suitable as a component of or for use with the machine of FIG. 8.

FIG. 9 shows in more detail various components of the TPM 872 of the system 800. In the example of FIG. 9, the TPM 872 includes a memory mapped I/O component for communication via the LPC bus 870, non-volatile storage, platform configuration registers (PCRs), an attestation identity key, an endorsement key, a random number generator, a SHA-1 engine for performing SHA-1 hash operations, a key generation component for generation of keys (e.g., RSA keys), an RSA engine, an optional input module and an execution engine. As described herein, security code 150 in the example of FIG. 1 may include instructions that cause a TPM such as the TPM 872 to perform actions. For example, the code 150 may instruct the TPM 872 to use the SHA-1 engine to measure CRTM code and a BIOS code (or management code) component and store the value in one of the PCRs. Where a signature or a certificate require authentication (e.g., validation, verification, etc.), instructions may cause a TPM such as the TPM 872 to perform various acts (e.g., decryption, hashing, etc.).

CONCLUSION

Although exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

What is claimed is:
1. A method comprising:
prior to loading an operating system and prior to commencing a dynamic root of trust measurement session, creating one or more hashes, each hash associated with core root of trust measurement code, system management code, or core root of trust measurement code and system management code;
prior to loading the operating system and prior to commencing the dynamic root of trust measurement session, storing the one or more hashes in one or more secure registers;
prior to commencing the dynamic root of trust measurement session, loading the operating system;
after loading the operating system and prior to commencing the dynamic root of trust measurement session, validating one or more certificates, each certificate associated with the core root of trust measurement code, the system management code, or the core root of trust measurement code and the system management code;

after loading the operating system and prior to commencing the dynamic root of trust measurement session, responsive to the validation of the one or more certificates, providing one or more expected hashes, each expected hash associated with the core root of trust measurement code, the system management code, or the core root of trust measurement code and the system management code;

after loading the operating system and prior to commencing the dynamic root of trust measurement session, based on successfully matching each of the one or more expected hashes to a corresponding one of the one or more stored hashes, commencing the dynamic root of trust measurement session;

after commencing the dynamic root of trust measurement session, updating the core root of trust measurement code, the system management code, or the core root of trust measurement code and the system management code;

altering one or more of the one or more stored hashes;

entering a sleep state;

resuming from the sleep state; and preventing execution of a loaded hypervisor based on the alteration of the one or more of the one or more stored hashes.

2. The method of claim 1 comprising, after commencing the dynamic root of trust measurement session, updating the system management code and altering one or more of the one or more stored hashes.

3. The method of claim 2 further comprising rebooting wherein the rebooting comprises executing the core root trust measurement code and the system management code.

4. The method of claim 2 wherein the updating comprises providing a certificate for the updated code.

5. The method of claim 1 comprising updating the core root of trust measurement code and altering one or more of the one or more stored hashes.

6. The method of claim 5 further comprising rebooting wherein the rebooting comprises executing the core root trust measurement code and the system management code.

7. The method of claim 5 wherein the updating comprises providing a certificate for the updated code.

8. The method of claim 1 further comprising, after commencing the dynamic root of trust measurement session, loading a hypervisor secured by the dynamic root of trust session.

9. The method of claim 1 wherein, if the matching fails to match one or more of the one or more expected hashes, transmitting a message via a network.

10. The method of claim 9 further comprising, responsive to the transmitted message, receiving one or more certificates.

11. The method of claim 10 further comprising repeating the validating.

12. An apparatus comprising:
one or more processors;
memory;
circuitry configured to
prior to load of an operating system and prior to commencement of a dynamic root of trust measurement session, create one or more hashes, each hash associated with core root of trust measurement code, system management code or core root of trust measurement code and system management code;
prior to load of the operating system and prior to commencement of a dynamic root of trust measurement session, store the one or more hashes in one or more secure registers;
load the operating system;
after load of the operating system and prior to commencement of a dynamic root of trust measurement session, validate one or more certificates, each certificate associated with the core root of trust measurement code, the system management code, or the core root of trust measurement code and the system management code;
after load of the operating system and prior to commencement of a dynamic root of trust measurement session, based on the one or more validated certificates, provide one or more expected hashes, each expected hash associated with the core root of trust measurement code, the management code, or the core root of trust measurement code and the system management code;
after load of the operating system and prior to commencement of a dynamic root of trust measurement session, decide if each of the one or more expected hashes matches a corresponding one of the one or more stored hashes;
after load of the operating system and prior to commencement of a dynamic root of trust measurement session, if each of the one or more expected hashes matches a corresponding one of the one or more stored hashes, commence the dynamic root of trust measurement session;
after commencement of the dynamic root of trust measurement session, update the core root of trust measurement code, the system management code, or the core root of trust measurement code and the system management code;
alter one or more of the one or more stored hashes;
enter a sleep state;
resume from the sleep state; and
prevent execution of a loaded hypervisor based on the alteration of the one or more of the one or more stored hashes.

13. The apparatus of claim 12 wherein the circuitry configured to create one or more hashes comprises trusted platform module circuitry.

14. The apparatus of claim 12 wherein the one or more secure registers comprise one or more platform configuration registers of a trusted platform module.

15. The apparatus of claim 12 further comprising circuitry configured to load a hypervisor secured by the dynamic root of trust measurement session.

16. One or more computer-readable non-transitory storage media comprising computer-executable instructions to instruct a computer to:
after load of an operating system and prior to commencement of a dynamic root of trust measurement session, access one or more stored hashes, each hash associated with core root of trust measurement code, system management code, or core root of trust measurement code and system management code;
after load of the operating system and prior to commencement of the dynamic root of trust measurement session, validate one or more certificates, each certificate associated with the core root of trust measurement code, the system management code, or the core root of trust measurement code and the system management code;
after load of the operating system and prior to commencement of the dynamic root of trust measurement session, based on the one or more validated certificates, provide one or more expected hashes, each expected hash associated with the core root of trust measurement code, the system management code, or the core root of trust measurement code and the system management code;

after load of the operating system and prior to commencement of the dynamic root of trust measurement session, decide if each of the one or more expected hashes matches a corresponding one of the one or more stored hashes;

after load of the operating system and prior to commencement of the dynamic root of trust measurement session, if each of the one or more expected hashes matches, permit commencement of the dynamic root of trust measurement session;

after commencement of the dynamic root of trust measurement session, alter one or more of the one or more stored hashes responsive to update of the core root of trust measurement code, the system management code, or the core root of trust code and the system management code;

enter a sleep state;

resume from the sleep state; and prevent execution of a loaded hypervisor based on alteration of one or more of the one or more stored hashes.

17. The one or more computer-readable non-transitory storage media of claim 16 further comprising instructions to reboot the computer if one or more of the one or more hashes do not match.

18. The one or more computer-readable non-transitory storage media of claim 16 further comprising instructions to transmit a message via a network if one or more of the one or more hashes do not match.

* * * * *